US012649466B2

(12) United States Patent
Huskic et al.

(10) Patent No.: US 12,649,466 B2
(45) Date of Patent: Jun. 9, 2026

(54) METHOD AND DEVICE FOR THE LONGITUDINAL CONTROL OF A VEHICLE

(71) Applicants: Mercedes-Benz Group AG, Stuttgart (DE); Robert Bosch GmbH, Stuttgart (DE)

(72) Inventors: Goran Huskic, Stuttgart (DE); Atta Oveisi, Fellbach (DE); Alexander Fürsich, Stuttgart (DE); Thomas Rothermel, Renningen (DE); Peter Boesch, Leonberg (DE); André Kempf, Stuttgart (DE); Klaus-Peter Kuhn, Hochdorf (DE)

(73) Assignees: Mercedes-Benz Group AG, Stuttgart (DE); Robert Bosch GmbH, Stuttgart (DE)

( * ) Notice: Subject to any disclaimer, the term of this patent is extended or adjusted under 35 U.S.C. 154(b) by 43 days.

(21) Appl. No.: 18/714,145

(22) PCT Filed: Nov. 21, 2022

(86) PCT No.: PCT/EP2022/082611
§ 371 (c)(1),
(2) Date: May 29, 2024

(87) PCT Pub. No.: WO2023/099260
PCT Pub. Date: Jun. 8, 2023

(65) Prior Publication Data
US 2025/0033637 A1 Jan. 30, 2025

(30) Foreign Application Priority Data
Nov. 30, 2021 (DE) .................... 10 2021 213 483.1

(51) Int. Cl.
*B60W 30/14* (2006.01)
*B60W 10/18* (2012.01)

(52) U.S. Cl.
CPC .......... *B60W 30/143* (2013.01); *B60W 10/18* (2013.01); *B60W 2520/105* (2013.01); *B60W 2552/30* (2020.02)

(58) Field of Classification Search
CPC .............. B60W 30/143; B60W 10/18; B60W 2520/105; B60W 2552/30; B60W 30/146;
(Continued)

(56) References Cited

U.S. PATENT DOCUMENTS

| | | | | |
|---|---|---|---|---|
| 5,665,026 | A * | 9/1997 | Linden | B60W 30/146 |
| | | | | 180/170 |
| 2013/0138319 | A1 | 5/2013 | Schuberth et al. | |
| 2022/0203989 | A1* | 6/2022 | Hosoya | B60W 60/0055 |
| 2022/0379920 | A1* | 12/2022 | Yang | B60W 30/12 |
| 2024/0042994 | A1* | 2/2024 | Tsutsui | B60W 40/105 |

FOREIGN PATENT DOCUMENTS

| | | |
|---|---|---|
| DE | 19509492 A1 | 9/1996 |
| DE | 102011102435 A1 | 11/2012 |

(Continued)

OTHER PUBLICATIONS

Machine translation of DE-102017010180-B3 (Year: 2019).*
(Continued)

*Primary Examiner* — Navid Z. Mehdizadeh
*Assistant Examiner* — Caitlin R McCleary
(74) *Attorney, Agent, or Firm* — Marshall & Melhorn, LLC

(57) ABSTRACT

A method for the longitudinal control of a vehicle according to a target trajectory specifying a series of target positions to be adopted by the vehicle over time. Based on an actual status of the vehicle, a control acceleration is determined for the purpose of trajectory control, by which the vehicle is to be accelerated according to specifications of the target trajectory. Based on an actual speed of the vehicle and a predefined maximum speed which should not be exceeded when travelling the target trajectory, a control acceleration
(Continued)

for the purpose of speed control is determined, by which the vehicle is to be accelerated in order to travel at the maximum speed. Both control accelerations are supplied to an arbiter which determines a resulting control acceleration from same, wherein the vehicle is accelerated according to the resulting control acceleration. A device for the longitudinal control of the vehicle is provided.

6 Claims, 5 Drawing Sheets

(58) Field of Classification Search
CPC ..... B60W 2050/0008; B60W 2520/10; B60W 2710/182; B60W 2720/106; B60W 60/0015; B60W 30/10; B60W 40/072
See application file for complete search history.

(56) References Cited

FOREIGN PATENT DOCUMENTS

| | | | |
|---|---|---|---|
| DE | 102017114471 A1 | 3/2018 | |
| DE | 102017010180 B3 * | 4/2019 | ............ B60W 30/16 |
| DE | 102018210648 A1 | 1/2020 | |
| JP | 2019-084842 A | 6/2019 | |

OTHER PUBLICATIONS

European Patent Office, International Search Report and Written Opinion in Application No. PCT/EP2022/082611, dated Mar. 6, 2023, 12 pages, Rijswijk, Netherlands.
Japanese Patent Office, Office Action in Application No. JP 2024-531594, dated Jan. 7, 2025, 5 pages.

* cited by examiner

METHOD AND DEVICE FOR THE LONGITUDINAL CONTROL OF A VEHICLE

TITLE

Field

The invention relates to a method for the longitudinal control of a vehicle.

The invention also relates to a device for the longitudinal control of a vehicle.

BACKGROUND

DE 10 2017 010 180 B3 discloses a device and a method for controlling a longitudinal position of a vehicle by means of a longitudinal position controller which generates a longitudinal acceleration control signal for a subordinate acceleration control unit from a longitudinal dynamic pre-control setpoint variable and longitudinal dynamic control error variables. A current control reference point corresponding to a current point in time and a preceding control reference point corresponding to a predeterminable look-ahead point in time are determined as control-relevant points in time. For each of the control reference points, current or predicted actual/target deviations of a longitudinal position, a driving speed and an acceleration are determined and used as the basis for forming the longitudinal dynamic control error variables. Furthermore, target acceleration values are determined for each of the control reference points and used as the basis for forming the longitudinal dynamic pre-control target value. The longitudinal dynamic pre-control setpoint is formed by summing the acceleration setpoints determined for the control reference points in a weighted manner.

The object of the invention is to provide a novel method and a novel device for the longitudinal control of a vehicle.

According to the invention, the object is achieved by a method and by a device having the features specified in the claims described herein.

Advantageous embodiments of the invention are the subject of the subclaims.

In the method according to the invention for longitudinal control of a vehicle as a function of a target trajectory, which specifies a series of target positions to be assumed by the vehicle over time, an actuating acceleration for trajectory control is determined based on an actual state of the vehicle, by means of which the vehicle is to be accelerated in accordance with the specifications of the target trajectory. Based on an actual speed of the vehicle and a specified maximum speed, which should not be exceeded when following the target trajectory, an actuating acceleration for speed control is determined, by means of which the vehicle is to be accelerated in order to guide it at the maximum speed. Both actuating accelerations are fed to an arbiter, which uses them to determine a resulting actuating acceleration, whereby the vehicle is accelerated in accordance with the resulting actuating acceleration.

Trajectory control of an automated, in particular highly automated or autonomously driving vehicle, is a fundamental prerequisite for realizing the automated driving function. This involves deciding which actions the vehicle should perform in the future based on data from an environment detection system. The result of this decision is a trajectory which, for example, maps the position of the vehicle on a road over time and serves as a movement reference in a known vehicle environment. The trajectory control is intended to follow the trajectory as accurately as possible. If, for any reason, a major longitudinal position control error has built up, a trajectory specification at the target position does not correspond to a trajectory specification at an actual position on the road at which the vehicle is currently located. This means that a "target time" continues to run.

A control loop intended for automated control of the vehicle, for example, is a complex system with various system limitations that must be taken into account. In such a system, a speed limit plays a particularly important role. For example, a defined maximum speed, e.g. less than 130 km/h, is specified for the vehicle as a system limitation and at the same time legal speed limits must be taken into account. Furthermore, a maximum permitted deviation from a trajectory speed stored in the specified target trajectory may be specified. These restrictions must be observed and correctly classified, especially if there is a discrepancy between an actual position of the vehicle and a target position derived from the target trajectory.

SUMMARY

By means of the present method, it is possible to take all the aforementioned limitations into account, so that reliable trajectory control can be realized with the aim of achieving a planned position at the associated time in accordance with a target trajectory. The actuating acceleration specified as the target value for trajectory control and/or the actuating acceleration for speed control are limited by the resulting actuating acceleration if they do not match the specification of the actual position. This can be the case, for example, if a longitudinal position control error has built up.

In contrast to conventional approaches to the automated operation of a vehicle, in which speed limitation generally runs parallel to trajectory control and thus always influences the control quality, the present method makes it possible to activate the limitation only shortly before a speed limit is reached. As a result, the control quality can be maintained up to this point in time. Nevertheless, the activation can take place sufficiently early to reliably prevent the speed limit from being exceeded.

This means that speed limits or speed restrictions in a complex automated vehicle can be reliably observed and correctly classified using the present method, even if there is a discrepancy between the actual position and the target position. The speed restriction does not affect the trajectory control all the time, but only when there is a risk of speed limits or speed restrictions being violated.

In one possible embodiment of the method, a curvature of the target trajectory is taken into account when determining the actuating acceleration. In this way, safe trajectory control can be realized.

In a further possible embodiment of the method, the specified maximum speed is determined from a minimum of a maximum trajectory speed, a legally permissible maximum speed and an absolute system-defined maximum speed. This enables a particularly reliable determination of the specified maximum speed.

In a further possible embodiment of the method, the maximum trajectory speed is determined from a sum of a local reference speed specified in the target trajectory at an actual position of the vehicle and a maximum permitted deviation of the local reference speed as a function of the actual speed and a curvature of the target trajectory at the actual position of the vehicle. This makes it possible to reliably limit the actuating acceleration at the actual position even if there is a large discrepancy between the actual position and the target position of the vehicle.

In a further possible embodiment of the method, the actual state of the vehicle is formed at least from the actual speed, an actual acceleration and/or an actual position of the vehicle. The actual state can be mapped very well using these variables, so that the actuating acceleration for trajectory control can be reliably determined.

In a further possible embodiment of the method, the target trajectory is fed to a trajectory controller, by means of which the vehicle is to be accelerated according to the specifications of the target trajectory using the controller actuating acceleration. The resulting actuating acceleration is fed to an acceleration control unit which is subordinate to the trajectory controller and which controls and/or regulates a real acceleration of the vehicle.

In a further possible embodiment of the method, the vehicle is decelerated when the resulting actuating acceleration assumes a negative value. This enables deceleration of the vehicle and therefore particularly safe operation of the vehicle.

The device according to the invention for longitudinal control of a vehicle as a function of a target trajectory, which specifies a series of target positions to be assumed by the vehicle over time, comprises a trajectory controller, which uses a target trajectory supplied to it to determine an actuating acceleration for trajectory control based on an actual state of the vehicle, by means of which the vehicle is to be accelerated in accordance with the specifications of the target trajectory. Furthermore, the device comprises a speed controller which, based on an actual speed of the vehicle and a predeterminable maximum speed, which should not be exceeded when following the target trajectory, determines an actuating acceleration for speed control, by means of which the vehicle is to be accelerated in order to guide it at the maximum speed. Furthermore, the device comprises an arbiter, which uses the two determined actuating accelerations to determine a resulting actuating acceleration, and an acceleration control unit, which is subordinate to the trajectory controller and accelerates the vehicle in accordance with the resulting actuating acceleration.

The present device enables reliable trajectory control with the aim of achieving a planned position at the associated time in accordance with a target trajectory. The actuating acceleration for trajectory control and/or the actuating acceleration for speed control specified as the target value can be limited by the resulting actuating acceleration if these do not match the specification of the actual position. This can be the case, for example, if a longitudinal position control error has built up.

In contrast to conventional approaches to the automated operation of a vehicle, in which speed limitation generally runs parallel to trajectory control and thus always influences the control quality, the present device makes it possible to activate the limitation only shortly before a speed limit is reached. As a result, the control quality can be maintained up to this point in time. Nevertheless, activation can take place sufficiently early to ensure that the speed limit is not exceeded. When the limitation is activated shortly before the speed limit is reached, the trajectory controller switches to a speed limitation or overrides an existing actuating acceleration. The trajectory controller can therefore be used to implement a complete solution for the trajectory control of an automated vehicle.

This means that the device can be used to reliably observe and correctly classify speed limits or speed restrictions in a complex automated vehicle, even if there is a discrepancy between the actual position and the target position. The speed restriction does not affect the trajectory control all the time, but only when there is a risk of speed limits or speed restrictions being violated.

In one possible embodiment of the device, the acceleration control unit is a vehicle braking system. This can be used to adjust the resulting actuating acceleration simply and reliably.

DESCRIPTION OF THE FIGURES

Examples of embodiments of the invention are explained in more detail below with reference to drawings.

DETAILED DESCRIPTION

Corresponding parts are marked with the same reference signs in all figures.

Figure 1:
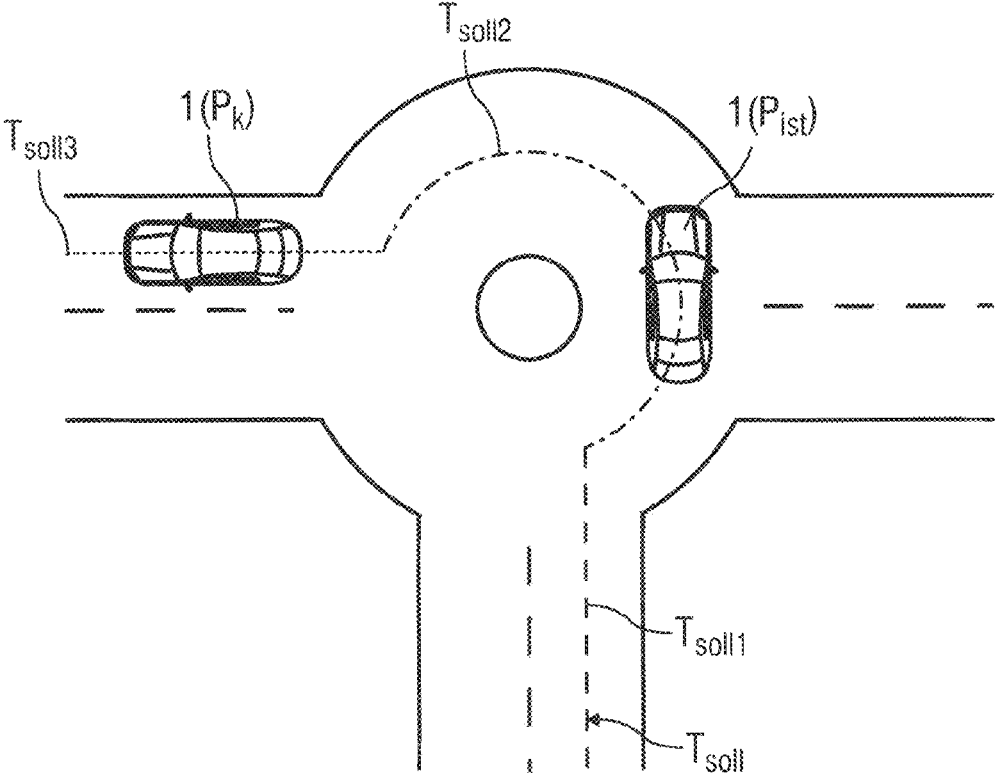
FIG. 1 is a schematic top view of a traffic situation with a vehicle in an actual position and a target position, FIG. 2 are schematic time sequences of speeds for a vehicle.

FIG. 1 is a top view of a traffic situation with a vehicle 1 in an actual position $P_{ist}$ and a target position $P_k$ as well as a target trajectory $T_{soll}$ with several trajectory sections $T_{soll1}$ to $T_{soll3}$.

The vehicle 1 is designed for automated, in particular highly automated or autonomous driving. Trajectory control is a fundamental prerequisite for the realization of such an automated driving function.

Figure 3:
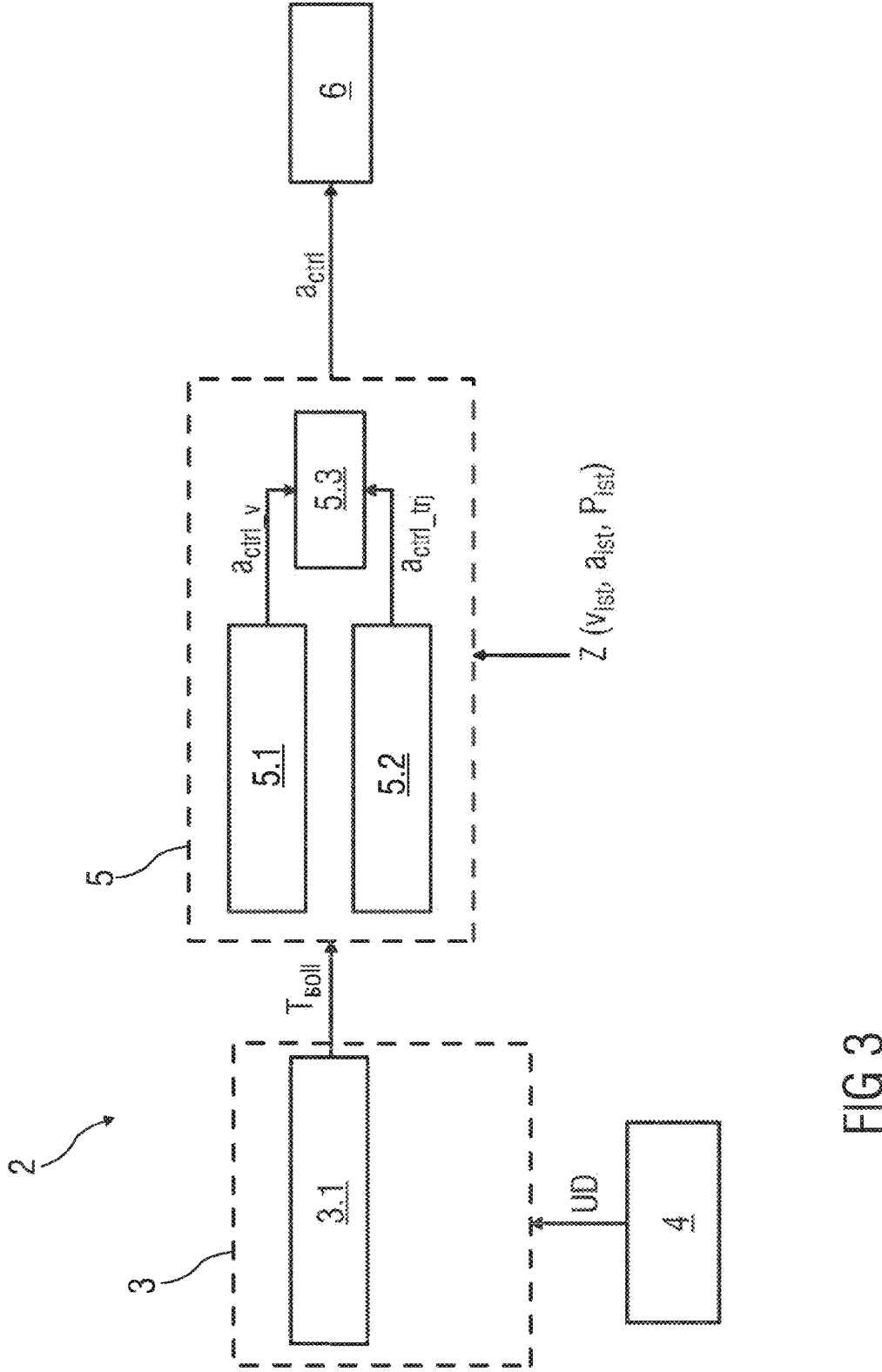
FIG. 3 is a schematic block diagram of a device for longitudinal control of a vehicle.

In this trajectory control, a decision is made on which actions the vehicle 1 should perform in the future based on data UD shown in more detail in FIG. 3 from an environment detection system. The result of this decision is the target trajectory $T_{soll}$, which, for example, represents a position of the vehicle 1 on a roadway over the time t and serves as a movement reference in a known vehicle environment. The trajectory control is intended to follow the trajectory as accurately as possible. If, for any reason, a major longitudinal position control error has built up, a trajectory specification at the target position $P_k$ does not correspond to a trajectory specification at the actual position $P_{ist}$ on the road at which the vehicle 1 is currently located. This means that a "target time" continues to run.

Using a traffic circle as an example, the illustration shows that the actual position $P_{ist}$ of the automated vehicle 1 is behind the target position $P_k$. The actual position $P_{ist}$ is located in the traffic circle, while the target position $P_k$ is already outside the traffic circle after leaving it.

Figure 2:
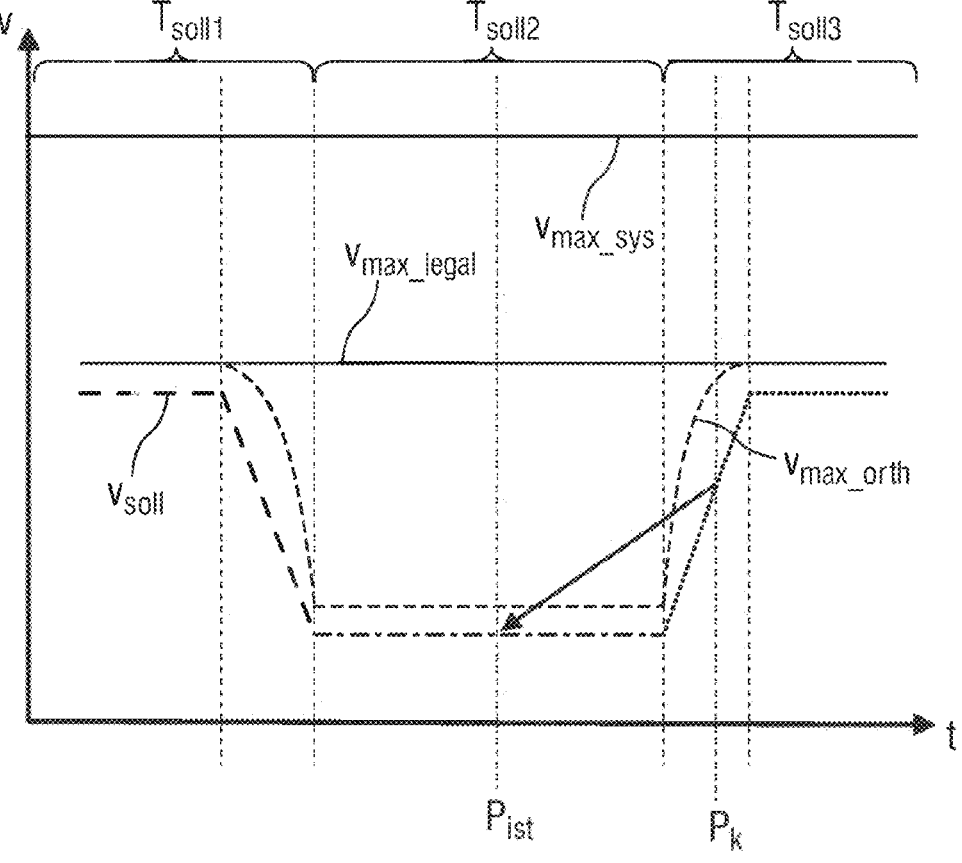

FIG. 2 shows a progression of speeds v for the vehicle 1 as a function of time t, whereby the speeds v comprise a maximum trajectory speed $v_{max\_orth}$, a legally permissible maximum speed $v_{max\_legal}$, an absolute system-defined maximum speed $v_{max\_sys}$ and a target speed $v_{soll}$ derived from the target trajectory $T_{soll}$.

According to the speed profile assigned to the target trajectory $T_{soll}$ with the target speed $v_{soll}$, it is intended that the vehicle 1 should travel at a low constant speed v within the traffic circle on the trajectory section $T_{soll2}$ and accelerate more strongly on the trajectory section $T_{soll3}$ after the traffic circle until a higher speed v is reached. The speed profile intended for the trajectory section $T_{soll3}$ is not suitable for use with a road geometry in the trajectory section $T_{soll2}$.

However, since, as shown in FIG. 1, the temporal reference point, i.e. the target position $P_k$ in the trajectory section $T_{soll3}$, and the local reference point, i.e. the actual position $P_{ist}$ in the trajectory section $T_{soll2}$, are far apart, there is a risk that the vehicle 1 is located on the trajectory section $T_{soll2}$ within the traffic circle and accelerates automatically because the temporal reference point is already further ahead, in this case on a straight line following the traffic circle in the trajectory section $T_{soll3}$.

FIG. 3 is a block diagram of a possible embodiment of a device 2 for longitudinal control of a vehicle 1.

The device 2 comprises a first computing unit 3 with a trajectory planning module 3.1, which plans the target trajectory $T_{soll}$ on the basis of data UD recorded by means of an environment detection sensor system 4.

In order to solve the problem illustrated in FIGS. 1 and 2 that the vehicle 1 is moved at an unadjusted speed v in automated driving mode if the actual position $P_{ist}$ deviates from the target position $P_k$, the target trajectory $T_{soll}$ is fed to a further computing unit 5 with a speed controller 5.1, a trajectory controller 5.2 and an arbiter 5.3.

A trajectory control performed by trajectory controller 5.2 and a speed limitation performed by speed controller 5.1 run in parallel and the outputs of both controllers must be coordinated.

The trajectory controller 5.2 uses the target trajectory $T_{soll}$ supplied to it to determine an actuating acceleration $a_{ctrl\_trj}$ for trajectory control based on an actual state Z of the vehicle 1, by means of which the vehicle 1 is to be accelerated in accordance with the specifications of the target trajectory $T_{soll}$. The actual state Z of the vehicle 1 is characterized, for example, by an actual speed $v_{ist}$, an actual acceleration $a_{ist}$ and the actual position $P_{ist}$ of the vehicle 1.

Figure 4:
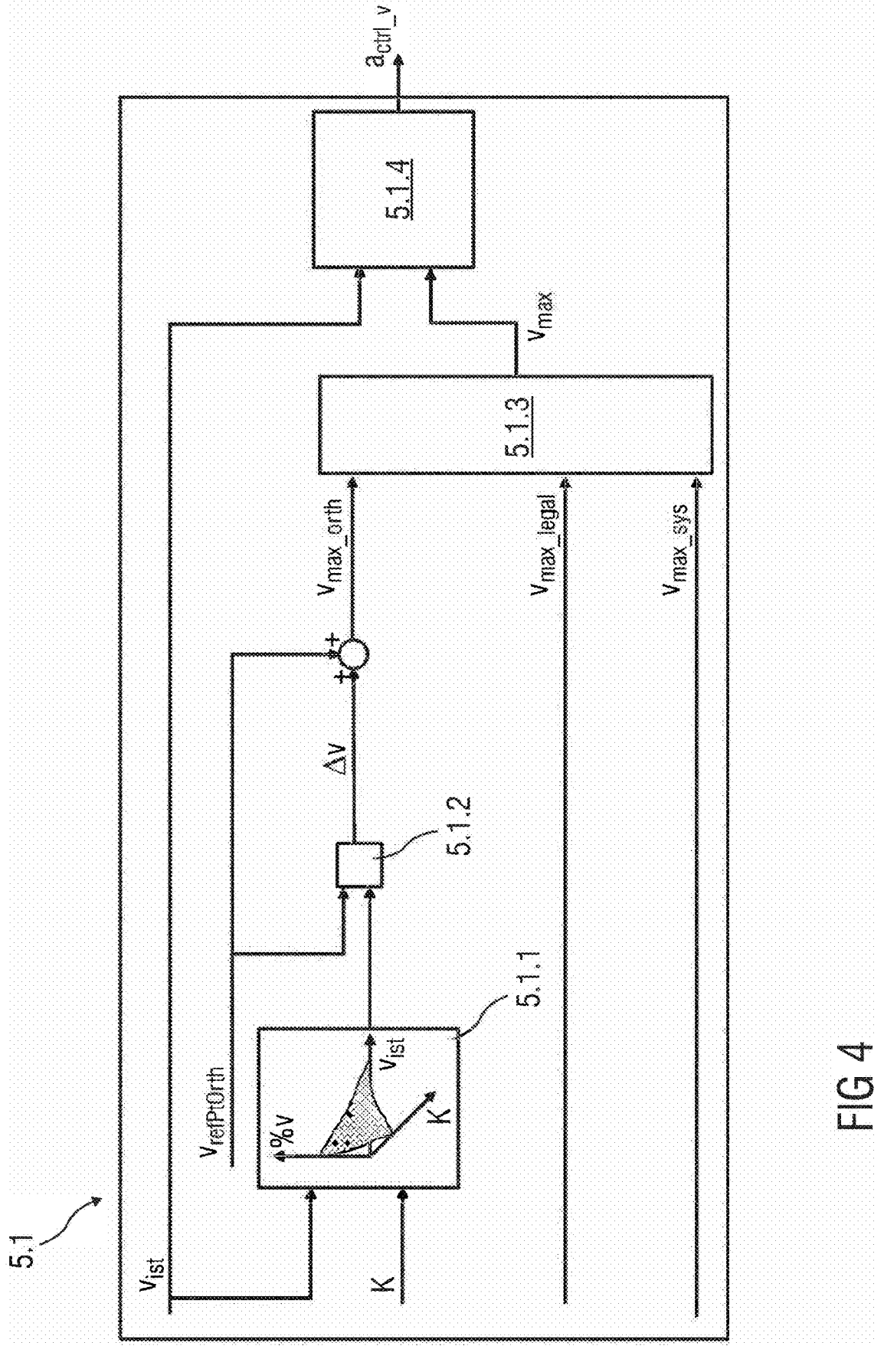
FIG. 4 is a schematic block diagram of a speed controller of a vehicle.

Furthermore, the speed controller 5.1 is used to determine an actuating acceleration $a_{ctrl\_v}$ for speed control, by means of which the vehicle 1 is to be accelerated in order to guide it at a maximum speed $v_{max}$ as shown in more detail in FIG. 4.

The two determined actuating accelerations $a_{ctrl\_trj}$, $a_{ctrl\_v}$ are fed to the arbiter 5.3, which uses them to determine a resulting actuating acceleration $a_{ctrl}$.

The resulting actuating acceleration $a_{ctrl}$ is fed to an acceleration control unit 6, which is subordinate to the trajectory controller 5.2 and accelerates the vehicle 1 in accordance with the resulting actuating acceleration $a_{ctrl}$. The acceleration control unit 6 is, for example, a vehicle braking system.

This means that the vehicle 1 is controlled by means of the trajectory control so that it follows the target trajectory $T_{soll}$, and the vehicle 1 is kept within defined speed limits by means of the speed limitation together with the arbiter 5.3.

FIG. 4 is a block diagram of a possible embodiment of the speed controller 5.1 as shown in FIG. 3.

The speed controller 5.1 comprises a characteristic curve 5.1.1, a multiplier 5.1.2, a limiting unit 5.1.3 and a control unit 5.1.4 and, based on the in particular measured actual speed $v_{ist}$ of the vehicle 1 and a predeterminable maximum speed $v_{max}$, which should not be exceeded when following the target trajectory $T_{soll}$, determines the actuating acceleration $a_{ctrl\_v}$ for the speed control, by means of which the vehicle 1 is to be accelerated in order to guide it at the maximum speed $v_{max}$.

The maximum speed $v_{max}$ is calculated using the limiting unit 5.1.3 from a minimum of a maximum trajectory speed $v_{max\_orth}$, the legally permissible maximum speed $v_{max\_legal}$ and the absolute system-defined maximum speed $v_{max\_sys}$.

The maximum trajectory speed $v_{max\_orth}$ is determined from a local reference speed $v_{refPtOrth}$ stored in the specified target trajectory $T_{soll}$ and specified for the actual position $P_{ist}$ of the vehicle 1 and from a maximum permissible deviation $\Delta v$ of the local reference speed $v_{refPtOrth}$ as a function of the actual speed $v_{ist}$ and a curvature K of the target trajectory $T_{soll}$ at the actual position $P_{ist}$ from the characteristic curve 5.1.1. In the characteristic curve 5.1.1, a percentage % v characterizing the deviation $\Delta v$ is determined as a two-dimensional function, whereby this percentage % v is inversely proportional to the curvature K and the actual speed $v_{ist}$. The percentage % v indicates a percentage of the local reference speed $v_{refPtOrth}$, which forms the permitted deviation $\Delta v$. A sum of the deviation $\Delta v$ and the local reference speed $v_{refPtOrth}$ results in the maximum trajectory speed $v_{max\_orth}$ at the actual position $P_{ist}$.

For example, with a local reference speed $v_{refPtOrth}$ of 130 km/h, a percentage % v of 5% can be permitted, resulting in a permitted deviation $\Delta v$ of 6.5 km/h. At a local reference speed $v_{refPtOrth}$ of 30 km/h, for example, a percentage % v of 20% can be permitted, resulting in a permitted deviation $\Delta v$ of 6 km/h. These percentages % v apply, for example, to straight stretches and decrease with increasing curvature K, for example in tight bends.

Such a limitation based on the local reference speed $v_{refPtOrth}$ offers the advantage that the target speed $v_{soll}$ can be limited accordingly at the actual position $P_{ist}$ even if there is a large discrepancy between the actual position $P_{ist}$ and the target position $P_k$. This is illustrated in FIGS. 1 and 2 using the example of the vehicle 1 driving through the traffic circle, where a setpoint specification expects a higher speed v, while the maximum trajectory speed $v_{max\_orth}$ derived from the local reference speed $v_{refPtOrth}$ does not allow the vehicle 1 to drive faster.

The control unit 5.1.4 then calculates the actuating acceleration $a_{ctr\_v}$, which is required to minimize the difference between the actual speed $v_{ist}$ and the maximum speed $v_{max}$, i.e. to reach the maximum speed $v_{max}$ and maintain its value.

Figure 5:
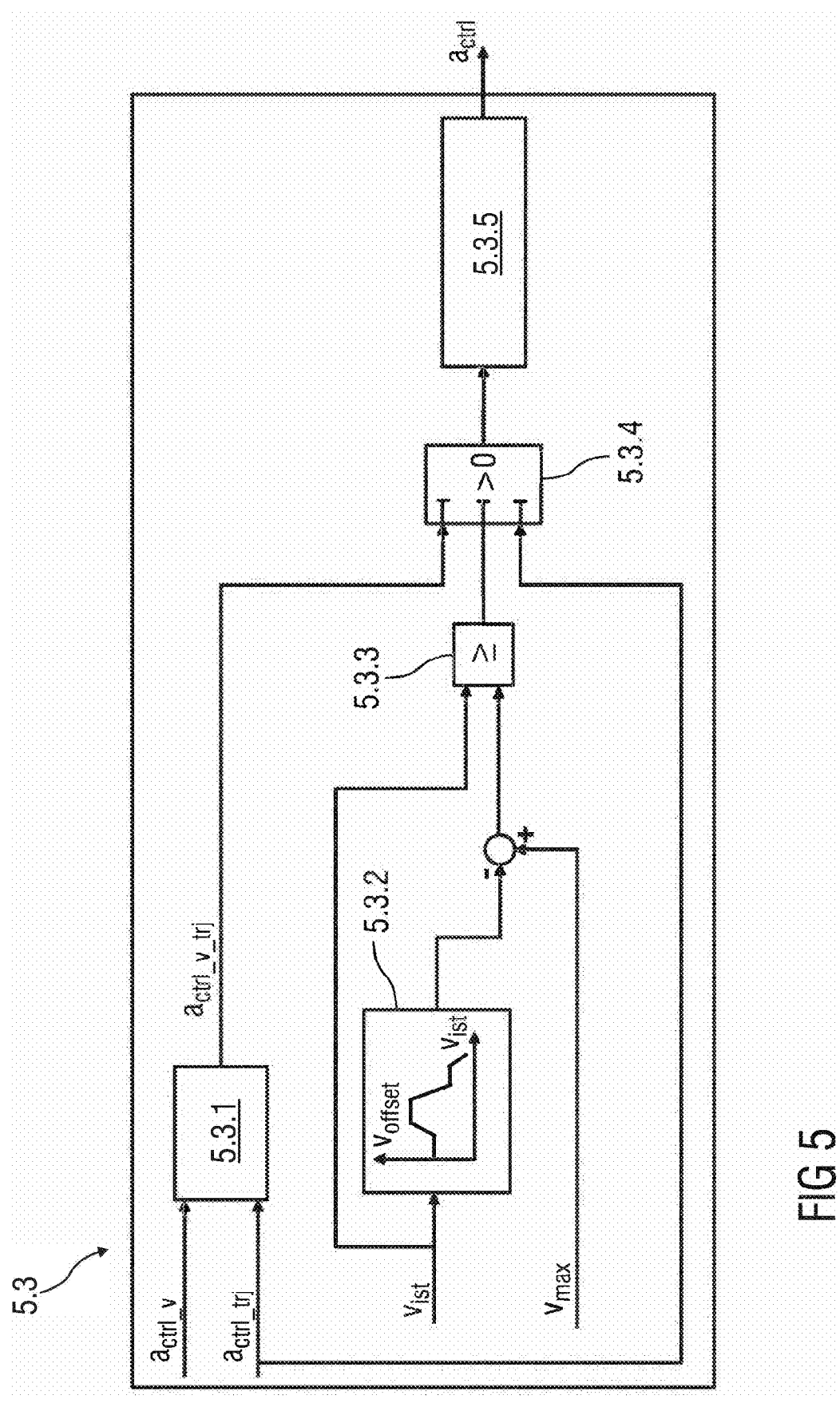
FIG. 5 is a schematic block diagram of an arbiter for arbitrating between trajectory and speed control of a vehicle.

FIG. 5 shows a block diagram of a possible design example of an arbiter 5.3 as shown in FIG. 3 for arbitrating between trajectory control and speed control of the vehicle 1.

For this purpose, the arbiter 5.3 comprises a crossfade module 5.3.1, a characteristic curve 5.3.2, a comparator 5.3.3, a changeover switch 5.3.4 and a limiting unit 5.3.5.

The outputs of the trajectory controller 5.2 and the speed controller 5.1 in the crossfade module 5.3.1 are crossfaded with a min function, a fuzzy function or another suitable function, for example, and a crossfaded actuating acceleration $a_{ctrl\_v\_trj}$ is formed from the actuating accelerations $a_{ctrl\_v}$, $a_{ctrl\_trj}$. The crossfaded actuating acceleration $a_{ctrl\_v\_trj}$ is only passed through the changeover switch 5.3.4 to the limiting unit 5.3.5 if the speed limitation is activated. Otherwise, only the trajectory control is connected to the output of arbiter 5.3.

To determine whether the speed limitation is activated, a speed offset $v_{offset}$ is determined using the characteristic curve 5.3.2 as a function of the actual speed $v_{ist}$, which speed offset $v_{offset}$ is subtracted from the actual speed $v_{ist}$. A resulting value is subtracted from the maximum speed $v_{max}$, whereby the value resulting from this is fed to the comparator 5.3.3 together with the actual speed $v_{ist}$. If the actual speed $v_{ist}$ is greater than or equal to the result of the subtraction, the comparator 5.3.3 outputs a signal that is greater than zero, indicating that the speed limitation is activated. If the actual speed $v_{ist}$ is less than the result of the subtraction, comparator 5.3.3 outputs a signal that is zero, indicating that the speed limitation is inactive.

The speed offset $v_{offset}$ is a function of the actual speed $v_{ist}$ and is particularly also dependent on the dynamic properties of the vehicle 1. The speed offset $v_{offset}$ is determined experimentally, for example, and can be implemented in the form of a lookup table.

Such a function of the arbiter 5.3 has the advantage that the speed control is not active all the time, as is the case, for example, if only a min function of the actuating acceleration $a_{ctrl\_trj}$ were used as arbitration. Instead, the speed control is only active shortly before the maximum speed $v_{max}$ is reached, so that the trajectory control can be active for the most part. As the speed control becomes active at an early stage, exceeding the maximum speed $v_{max}$ can be safely avoided.

LIST OF REFERENCE NUMBERS

1 vehicle
2 device
3 computing unit
3.1 trajectory planning module
4 environment detection sensor system
5 computing unit
5.1. speed controller
5.1.1 characteristic curve
5.1.2 multiplier
5.1.3 limiting unit
5.1.4 control unit
5.2 trajectory controller
5.3 arbiter
5.3.1 crossfade module
5.3.2 characteristic curve
5.3.3 comparator
5.3.4 switch
5.3.5 limiting unit
6 acceleration control unit
$a_{ctrl}$ resulting actuating acceleration
$a_{ctrl\_trj}$ actuating acceleration
$a_{ctrl\_v}$ actuating acceleration
$a_{ctrl\_v\_trjfaded}$ crossfaded actuating acceleration
$a_{ist}$ actual acceleration
K curvature
$P_{ist}$ actual position
$P_k$ target position
t time
$T_{soll}$ target trajectory
$T_{soll1}$ to $T_{soll3}$ trajectory section
UD data
v speed
$v_{ist}$ actual speed
$v_{max}$ maximum speed
$v_{max\_legal}$ permissible maximum speed
$v_{max\_orth}$ maximum trajectory speed
$v_{max\_sys}$ absolute system-defined maximum speed
$v_{offset}$ speed offset
$v_{refPtOral}$ reference velocity $v_{soll}$ target speed
Z actual state
% v percentage
Δv deviation

The invention claimed is:

1. A method for longitudinal control of a vehicle as a function of a target trajectory which specifies a series of target positions to be assumed by the vehicle over the time, wherein based on an actual state of the vehicle, a trajectory control actuating acceleration is determined, by means of which the vehicle is to be accelerated in accordance with specifications of the target trajectory, based on an actual speed of the vehicle and a predefined maximum speed, which should not be exceeded when following the target trajectory, a speed control actuating acceleration is determined, by means of which the vehicle is to be accelerated in order to guide it at the maximum speed, both actuating accelerations are fed to an arbiter, which determines a resulting actuating acceleration based on the actuating accelerations, the vehicle is accelerated according to the resulting actuating acceleration, wherein the predefined maximum speed is determined from a minimum of a maximum trajectory speed, a legally permissible maximum speed, and an absolute system-defined maximum speed, and wherein the maximum trajectory speed is determined from a sum of a local reference speed specified in the target trajectory at an actual position of the vehicle and a maximum permissible deviation of the local reference speed as a function of the actual speed and a curvature of the target trajectory at the actual position of the vehicle.

2. The method according to claim 1, wherein a curvature of the target trajectory is taken into account when determining the target trajectory actuating acceleration.

3. The method according to claim 1, wherein the actual state of the vehicle is formed at least from the actual speed, an actual acceleration and/or an actual position of the vehicle.

4. The method according to claim 1, wherein the target trajectory is fed to a trajectory controller, by means of which the vehicle is to be accelerated in accordance with the specifications of the target trajectory using the trajectory controller actuating acceleration, and the actuating acceleration resulting therefrom is fed to an acceleration control unit which is subordinate to the trajectory controller and which controls and/or regulates a real acceleration of the vehicle.

5. The method according to claim 1, wherein when the resulting actuating acceleration assumes a negative value, the vehicle is decelerated.

6. The device according to claim 1, wherein the actual position of the vehicle is behind the target position.

* * * * *